Aug. 4, 1959  R. S. EMERSON  2,898,100
GOVERNORS FOR PRIME MOVERS
Filed June 7, 1956  4 Sheets-Sheet 1

Inventor
R. S. Emerson

Aug. 4, 1959     R. S. EMERSON     2,898,100
GOVERNORS FOR PRIME MOVERS
Filed June 7, 1956     4 Sheets-Sheet 2
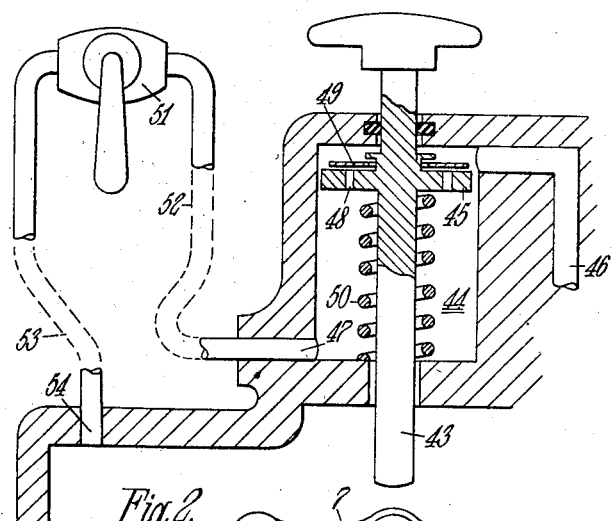
Fig.2.
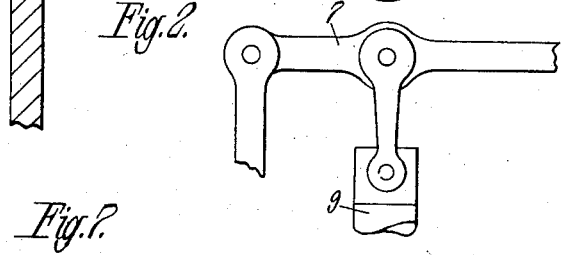
Fig.7.
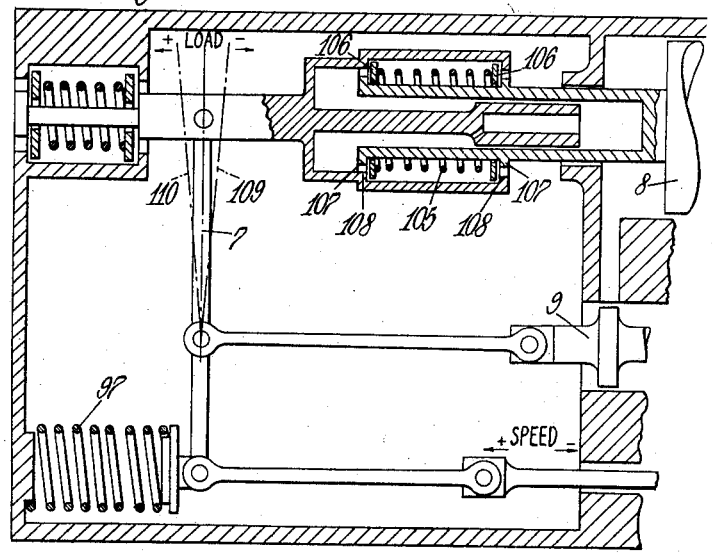
Inventor
R. S. Emerson
By Glascock Downing Seebold
Attys.

Aug. 4, 1959   R. S. EMERSON   2,898,100
GOVERNORS FOR PRIME MOVERS
Filed June 7, 1956   4 Sheets-Sheet 3

Inventor
R.S. Emerson
By
Attys

Inventor
R. S. Emerson

United States Patent Office

2,898,100
Patented Aug. 4, 1959

2,898,100

GOVERNORS FOR PRIME MOVERS

Reginald Stanley Emerson, Staines, England, assignor to Bryce Berger Limited, Staines, England Application June 7, 1956, Serial No. 589,926

13 Claims.  (Cl. 264—12)

This invention relates to governors for prime movers and has for its object to provide simple and reliable forms thereof which may be readily adapted to suit a variety of applications.

The invention consists in a governor for a prime mover comprising means, e.g. a pump driven by the prime mover for discharging fluid as a jet through a nozzle so as to produce a mass flow that varies as a function of the speed of a prime mover and a deflector disposed in the path of said jet and adapted to be deflected by said jet in opposition to a biasing force, said deflector being coupled either directly or by way of a servo device to a controlling member associated with said prime mover.

In order to enable the governor to select speed over a speed range, means may be provided whereby the magnitude of the biasing force can be controlled manually or by any other convenient means. For example the biasing force may be provided by a spring one abutment of which is connected to the deflector and the other by suitable mechanical means to a manually operable lever. Furthermore, for convenience the manually operable speed selector lever may be carried on a rotatable shaft operating on which may be a suitable over-centre toggle mechanism for the purpose of reducing the torque reaction at the spindle carrying the said lever and reducing it to a low and substantially constant magnitude.

If desired means may be incorporated for modifying the nozzle orifice area as a function of the pressure upstream of the orifice for the purpose of controlling the discharge velocity of the jet.

As an example, the nozzle may incorporate a slidable shell or sleeve reduced in diameter to form a discharge orifice at its outlet end. Fixed coaxially within the sleeve there may be a spear rod and the sleeve may be biased by a spring in the direction to reduce the area of the orifice so that the discharge velocity of the jet would remain sensibly constant irrespective of the speed of the prime mover.

The biasing means indicated above may comprise a spring whose rate will determine the speed droop characteristic (run-up or proportionality).

If a follow-up servo device is employed, means may be incorporated for re-setting the original speed of a prime mover after a change in conditions of load or torque. For instance, if a servo follow-up mechanism is employed using a floating differential lever coupled at three points to the deflector, servo valve and power piston respectively, then the feed-back connections between the power piston and differential lever can be decoupled in a conventional manner by interposing a dashpot and the lever can be biased towards a predetermined position by a centralising spring. By this means it can be ensured that under equilibrium conditions the deflector will always return to a fixed position and speed will be restored.

Without said decoupling the amount of run-up can only be reduced to a minimum figure consistent with stability of governing. If run-up below this figure is required it can be achieved by only partially restoring the original speed as in the preceding paragraph. This can be attained by fitting a second spring, in parallel with the dashpot.

This second spring will prevent the first from restoring the original speed since the position to which the deflector will return will be governed by the mutual effect of the two springs.

A single pump preferably displacement type, may be employed to serve for series operation of the primary governor and servo circuit since the deflector mechanism can readily be contained in a closed chamber which can be pressurised to any desired extent. Alternatively the servo mechanism may be disposed in a pressurised chamber and placed upstream of the primary governor.

In cases where it is necessary to preset the prime mover torque control to a starting position means may be provided to overcome the action of a safety spring whose purpose is to bias the power piston towards the "no torque" position should failure of the governor drive occur, thus permitting the power piston to be set to any desired position until working pressure has been built up in the servo circuit. Such means may comprise a cocking lever arranged so that operation of said lever carries with it the governor output lever together with said safety spring, a suitable pawl then preventing release of said spring. By this means the torque control of the prime mover may subsequently be set in the fully open or any other desired position. After the prime mover has started and sufficient working pressure obtains in the servo circuit to lift a pressure regulating accumulator mechanism, it may be arranged for the initial movement of said mechanism also to release the pawl and with it the safety spring allowing it once more to become effective.

Again in cases where sudden applications of load on the prime mover may occur at low speeds such as for example where the load is engaged through a clutch as in marine reversing gear boxes, it is an advantage if the value of the speed droop is considerably reduced at speeds immediately below that at which the clutch is engaged in order to provide maximum torque on clutch engagement and thus prevent stalling of the prime mover. This can be achieved by providing a lost motion device in the linkage between the deflector biasing spring and the deflector itself such that if the biasing spring is in its free and unstressed condition the deflector can be deflected towards the nozzle under the influence of a second auxiliary biasing spring having a considerably lower rate than the first.

In a similar case, in order to enable an excess of fuel to be supplied to a prime mover at low temperatures, means may be provided to allow a quantity of the fluid to by-pass the nozzle, this quantity being determined by a thermostat device sensitive to temperature.

Alternatively, means may be incorporated so as to modify the area of the nozzle as a function of temperature by utilising a spring manufactured from a material adapted to render the force exerted by it to vary with temperature. As a further alternative the nozzle area may be modified by varying the position of either the said sleeve or spear rod or both by any convenient method which may if desired be such as to cause the nozzle area to be a function of temperature.

In cases where the fuel is required to be cut off in order to stop a prime mover, a stop button may be provided which displaces the servo valve so as to cause the power piston to cut off fuel supply to the prime mover. This button may be operated manually or by any convenient means. Means may also be provided to operate this button by use of an internal hydraulic circuit.

In such cases a piston associated with the button is displaced by a flow of fuel taken from the servo circuit which occurs when a hydraulic line connected to the governor is opened.

In order to prevent the governor circuit becoming aerated due to fuel shortage, a chamber may be provided in which there is a float operated valve which in turn causes the said main stop control to operate and so stop the prime mover.

When applying the present invention to prime movers operating for instance generators on vehicles incorporating electrical transmission where the torque is required to be controlled as a function of the speed of the prime mover, a link may be connected to the speed selector lever say through a cam mechanism to provide a speed-sensing datum, and parallel with this link, a second link connected say by a lever to the output shaft of the governor may provide a torque-sensing datum. A unit associated with these two links may then be provided to operate the generator output control in the appropriate direction to maintain a generator torque according to a predetermined torque-speed law. This unit may comprise any convenient displacement sensing device adapted to operate the generator power control when the mutual axial relationship of the two links shifts.

The invention will now be described, by way of example, with reference to the accompanying diagrammatic drawings in which:

Figure 2 shows a sectional detail of a suitable stopping mechanism;

Figure 4 shows a sectional detail of mechanism for decreasing the speed drop characteristic of the prime mover;

Figure 7 shows a simplified layout of a further modified governor according to the present invention.

Figure 1:
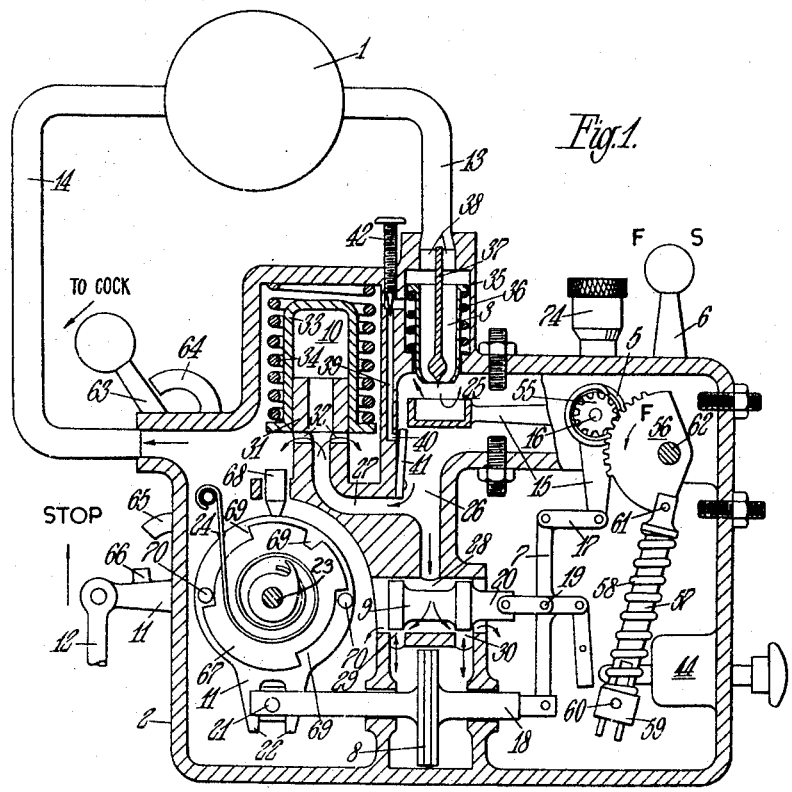
Figure 1 shows a cross sectional view of an I.C. engine governor according to the present invention.

In carrying the invention into effect according to one convenient form illustrated in Figure 1 by way of example as applied to an I.C. engine governor, a casing 2 is provided within which are housed the following components, a nozzle 3, a deflector 4, a helical control spring 5 acted upon by a speed selector lever 6 manually operable from outside the casing, a follow-up lever 7, a servo piston 8, a double-piston servo valve 9, a hydraulic accumulator 10 and one arm of a lever 11 constituting a connection between the servo piston 8 and a rod 12 for actuating a fuel injection pump control (not shown).

Outside the casing an engine driven hydraulic pump 1 is provided the outlet from which is connected by a pipe 13 passing through the casing to the aforesaid nozzle 3, the inlet to the pump being connected by a pipe 14 to the space within the casing.

The deflector 4 is shaped somewhat as the blade of a Pelton wheel and is carried on an arm of a bellcrank lever 15 pivoted about a fixed point 16 in relation to the casing. The lever 15 is connected to one end of said control spring 5 the other end of the spring being connected to the speed selector lever 6 through a geared quadrant and pinion.

The link 17 is pivotally connected to one end of the follow-up lever 7 to the remote end of which is pivotally connected the rod 18 of said servo piston 8.

To an intermediate point 19 on this follow-up lever the stem 20 of the double piston servo valve is pivotally connected by means of a link. The piston rod 18 is extended and connected by a pin 21 to a fork end 22 in lever 11 which is pivoted to the casing at 23; the piston rod 18 is urged longitudinally by a suitable spring 24 hereinbefore referred to as a safety spring.

The nozzle 3, deflector 4 and deflector lever 15 are enclosed in a compartment 25 within the casing 2 and to this compartment an outlet duct 26 is connected which duct is bifurcated, one limb 27 passing to the hydraulic accumulator 10 and the other passing to the annular space 28 in said double piston servo valve.

Ports 29 and 30 controlled by said valve 9 communicate with the respective ends of a cylinder containing the servo piston 8.

The hydraulic accumulator 10 comprises a fixed spigot member 31 furnished with ports 32 at a point intermediate of its length and over which member is fitted a sleeve 33 closed at its upper end. This latter sleeve is slidable in relation to the fixed spigot member and is urged towards a position closing said ports by a compression spring 34.

In operation the governor casing 2 is maintained full with engine fuel oil or other medium and the pump 1 causes oil from the casing 2 to pass by way of the nozzle 3 with high momentum into the compartment 25 containing the deflector 4 and as it is discharged from the nozzle it impinges on the deflector, thus exerting a thrust thereupon which is opposed by the torque of the control spring 5. Increase of speed increases this thrust and therefore deflects the deflector away from the nozzle, which in turn, via the servo circuit to which the deflector is attached, closes the injection pump control. The preloading torque of the control spring determines the speed at which the engine will run.

The linkage coupling the deflector 4 to the servo valve 9 and piston 8 is arranged so that the deflection of the deflector between its stops corresponds to full deflection of the output lever 11.

In order to start and run at idling speed, the speed selection lever 6 is set to the desired speed and the starter is operated. The pump 1 commences to deliver oil to the nozzle 3 which offers little resistance and the oil passes through it and is deflected round the deflector 4, which is held towards the nozzle by the speed control spring 5, and into the scoop chamber 25. The oil passes from here to the accumulator 10 and into an annular space between the lands of the servo valve 9.

The port leading to one side of the servo piston is uncovered (by virtue of the position of the deflector 4 relative to the servo piston 8) and oil passes therefore into this end of the servo cylinder. The port leading from the opposite end of the cylinder is also open and therefore after the pressure has risen sufficiently high, the thrust exerted on the piston 8 will overcome the spring 24 and the injection pump control rod 12 will be moved until the piston 8 has moved sufficiently to close the valve ports 29 and 30.

The hydraulic circuit is now completely sealed and the pressure therefore rises until the accumulator spring 34 is overcome by hydraulic loading and the sleeve 33 rises with increase of pressure and pump delivery until at a higher pressure it uncovers the ports 32 and the oil is spilled into the main casing 2 whence it returns to the pump inlet pipe 14.

In the meantime the engine has started and gathered speed. The flow has therefore increased proportionally and as the engine approaches idling speed, the thrust developed by the jet will have caused sufficient reaction at the deflector to overcome the torque of the control spring and the deflector will therefore move away from its stop and cause the servo valve to open in the reverse direction. As soon as this occurs the servo piston will reverse its operation and attempt to keep the valve closed by virtue of the differential action of the follow-up lever. As the piston 8 moves, the volume of the fuel injected into the engine will decrease and so will the engine acceleration until finally it will reach an even speed.

When the engine is running under steady conditions of load and speed and the load is increased, the operation is as follows:

As soon as the load is increased the engine speed falls and the jet force on the deflector 4 diminishes. The deflector therefore commences to move towards the nozzle 5 and its displacement is followed faithfully by the servo piston 8 which increases the amount of fuel delivered to the engine. At first this will not be sufficient to maintain engine speed and the speed will therefore continue to fall but with a diminishing rate of deceleration until finally it will stabilise at a new speed.

When the engine is running under steady conditions of load and speed and load is decreased, then the operation of the governor is the converse of the foregoing explanation.

In a practical construction of governor embodying the present invention, it is preferred that the output shaft safety spring is of flat material in the form of a spiral.

In carrying the invention into effect in a further convenient form illustrated in Figure 1, the nozzle 3 includes the slidable sleeve 35 biased contra to the direction of flow of oil by spring 36. Spear rod 37 is located within the sleeve by the radial fins 38 of which there may be any number. The nozzle operates in the following manner:

When the pump is stationary the sleeve will be urged by the spring in an upward direction and may reduce the annular space between the spear rod and the outlet end of the sleeve to zero. As flow commences the pressure will build up and bear upon the closed in end of the sleeve until it reaches sufficient magnitude to overcome the force of the spring and cause the sleeve to be displaced downwards and open a space between it and the spear rod allowing the oil to escape at a pressure consistent with the force of the spring.

The rate and force of the spring will together govern the velocity of the jet of oil escaping from the nozzle as the mass flow varies between zero and maximum and the product of this mass flow and the velocity of the jet produces the thrust against the deflector which constitutes the speed sensing mechanism of the governor. It will be understood that suitable choice of this spring enables the relationship between the thrust at the deflector and the speed of the pump producing the mass flow to be modified to a considerable extent to suit the required characteristics of the governor.

In carrying the invention into effect according to another convenient form in order to further modify the said characteristic in sympathy with temperature changes of the oil the material from which spring 36 is manufactured may be suitably chosen so as to modify the force it exerts according to its temperature.

To carry the invention into effect according to another convenient form in order to further modify the said characteristic in sympathy with temperature changes of the oil or any other part of the governor, engine or other mechanism either the sleeve 35, the spear rod 37 or both may be adapted to be displaced axially by means of, for instance, a conventional mechanism such as a Bourdon tube coupled to a container filled with mercury or other suitable medium said container being so positioned as to be sensitive to the desired temperature change.

The invention may be carried into effect in another convenient form in Figure 1 to modify the said characteristic in sympathy with temperature changes in an alternative manner. A duct 39 may be arranged to communicate the upstream side of the nozzle 3 with deflector chamber 25. Flow through this duct by virtue of the pressure drop which occurs across orifice 3 can be made to vary according to changes of temperature by causing a restriction 40, the area through which is controlled either by the simple expedient for example of providing a form of flap valve 41 over one of the ends of the duct said flap being located at its end remote from the duct and being manufactured from a material which deflects when its temperature changes.

Concurrently with said temperature sensitive flap valve 41 a manually or otherwise controlled restriction 42 may also be fitted to operate in series with the flap valve as shown in Figure 1, or if desired it may be fitted in an extra duct connected in parallel with duct 39.

In order to carry the invention into effect according to another convenient form illustrated in Figure 2, a suitable stopping mechanism may be provided consisting of a rod 43 passing axially through a cylinder 44 formed in the main housing said rod having a piston portion 45 which fits the cylinder and carrying on its outer extremity a suitable button for manual operation or other suitable fitting adapted for operation by any other means. A duct 46 communicating with a pressurised circuit, preferably the servo circuit of the governor itself, leads into one end of the cylinder and another duct 47 connects the other end of the cylinder to a terminal point on a convenient face of the governor housing.

Figure 3:
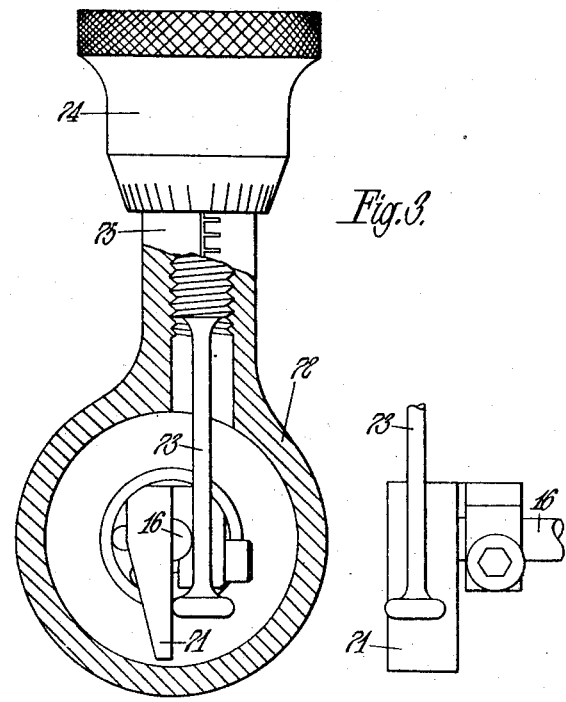
Figure 3 shows a sectional detail of a suitable mechanism for adjusting the speed droop characteristic of the prime mover.

Piston 45 may be provided with holes 48 of which there may be any number, one end of said holes being covered by a disc valve 49 which may if necessary be urged by a spring to close the holes. A spring 50 is also provided axial of rod 43 to urge the piston to one end of its stroke. The end of rod 43 remote from the button is in close proximity to the linkage coupled to the governor, servo valve 9 (Figure 1 and Figure 3 show alternative arrangements). A convenient valve or cock 51, manually or remotely operated, is connected by conduits 52 and 53 to a terminal point 54 communicating with the space in the governor housing.

In operation when the prime mover is running at steady conditions spring 50 holds rod 43 in such a position that rod 43 is clear of the servo valve linkage 7 and since valve 51 is closed preventing flow from the pressurised circuit in communication with cylinder 44 through conduit 46, there is no pressure difference obtaining across piston 45.

If the button is depressed against the force of spring 50 valve 49 will lift and allow the oil trapped in cylinder 44 to pass to the other side of piston 45 and so prevent any resistance to displacement of the piston. When the button has been depressed sufficiently the inner end of rod 43 will contact servo valve linkage 7 and displace servo valve 9 against the reaction of the deflector mechanism. The displacement of the valve will therefore override the deflector and can be arranged to cause the servo piston through its associated linkage items 21, 22, 11 and 12 (Figure 1) to stop the prime mover.

Referring now again to Figure 1 the speed selector lever 6 will build up an increasing torque reaction as higher speed is selected due to the increasing torque reaction of control spring 5 and the effect of the ratio of the pinion and quadrant 55 and 56. In order substantially to overcome this increasing torque reaction a rod 57, spring 58, abutment 59 and fixed pin 60 may be fitted. The geometrical relationship between pin 61, shaft 62 and fixed pin 60 and the rate and load of spring 58 can be suitably chosen so that in effect a torque substantially equal and opposite to the torque reaction of the control spring 5 can be developed by said mechanism so as substantially to balance said reactions.

Referring again to Figure 1 in order to preset the prime mover control to a suitable position prior to starting, where this is necessary, provision has been made to overcome the effect of safety spring 24 one of whose purposes is to maintain the control in a "no torque" position, when the prime mover is stationary. A cocking lever 63 is provided and carried by output shaft 23. When the cocking lever is against its stop 64 the output shaft is free to rotate within the cocking lever boss throughout its full arc of travel as dictated by the stroke of the servo piston. If the cocking lever is moved in an anticlockwise direction, however, a suitable pad 65 on its boss engages a mating pad 66 on the outer arm of the output lever 11 so that continued motion of the cocking lever carries with it the output lever 11, servo piston 8, safety spring hub 67 and safety spring 24.

Since the prime mover is stationary there is no flow of oil in the governor and the accumulator sleeve 33 will be depressed by its spring 34 against pawl 68 whose lower end will therefore be pressing against the periphery of hub 67. A notch 69 in said periphery is provided so that just as the servo piston reaches full travel pawl 68 is pressed firmly into the notch by spring 33. The cocking lever can now be returned to its stop position and the safety spring hub will be retained but the governor output lever by virtue of the two clearance grooves 69 for the drive pins 70 remains free to be set in any desired position.

As soon as the prime mover gathers sufficient speed, after starting, to cause the accumulator sleeve 33 to rise, pawl 68 is released and safety spring 24 turns its hub 67 until pins 70 once more contact the end faces of clearance grooves 69 and transmit the torque of the spring to output lever 11.

In carrying the invention into effect in a further form illustrated in Figure 3, a mechanism may be provided for the purpose of adjusting the speed droop characteristic of the governor. (The location of the mechanism is shown in Figure 1.) The deflector lever spindle 16 of the governor may be provided with an abutment 71 extending radially through the axis of the spindle such that the axis of the spindle lies across a radial face. A housing 72 surrounds the abutment and is provided with a threaded hole substantially radially of the spindle but which may be slightly offset to one side to accommodate an elastic beam 73 provided with a thread engaging that in the housing, and a circular button at the inner extremity which contacts the radial face of the abutment. A thimble 74 is attached to the outermost extremity of the beam and arranged to surround a spigot portion 75 of the housing. Graduations may be engraved on the thimble and a cursor line may be engraved on the spigot portion so as to correlate the distance of the contact point of the button on the abutment face from the axis of spindle 16 to a figure which may conveniently be obtained from the graduations on the thimble.

Deflection of the spindle under the influence of the deflector 4 and its associated control spring 5 will also cause deflection of the beam and furthermore the resistance to deflection of the deflector caused by the beam will increase with the radial distance between the point of contact of the button on the abutment face and the axis of the spindle. The greater the above distance, the greater must be the speed change necessary to cause unit deflection of the deflector and the greater therefore will be the speed droop of the prime mover relative to a given increase in load.

The whole of the above unit may conveniently be attached to the outside of the governor housing and provision may be made for it to be radially adjustable about the centre of the deflector lever spindle 16.

This radial adjustment influences the characteristic of the governor in the following manner: The setting of the beam 73 relative to the abutment face 71 may be such that the abutment face 71 is parallel to the axis of the beam (and the beam is in its free state), when the prime mover is operating at maximum torque. By this means it can be assured that when the speed droop adjustment is operated (for example when balancing the individual loads of a number of prime movers operating in parallel against a common load) that the prime mover will always return to the same speed at maximum load.

In carrying the invention into effect in a further form, illustrated in Figure 4, mechanism may be added to decrease the speed droop characteristic immediately below the speed at which the load on the prime mover may be suddenly increased (as for example in applications where the load is applied through a form of clutch in marine applications employing reversing gear boxes).

Spring 76 is coupled to the lever 77 which in turn is located on the deflector spindle 16. Screw 78 serves both as an abutment for spring 76 and also as an adjustment. Near to the periphery of the hub of lever 77 are two pins 79 and free to rotate on spindle 16 is a further hub 80 having two clearance grooves 81 for said pins. Attached to hub 80 is the helical control spring 5.

Spring 76 may have a lower effective rate in terms of torque at spindle 16 than the helical torsion control spring 5 and therefore if spring 76 be allowed to act on its own as an auxiliary control spring it would produce less speed droop than the main control spring and adjustment 78 would serve as a speed control suitable for setting the speed at which it is desired that this low speed droop characteristic should be effective. As a higher speed is selected by operation of the main speed selector lever 6 (Figure 1), the main control spring 5 causes its hub 80 to rotate anticlockwise until the extremities of the clearance grooves 81 contact the pins 79 and exert an extra torque on spindle 16 which has the effect of increasing the speed selection and since the deflector would not be operating against both springs 5 and 76 which together have a higher combined rate in terms of torque at spindle 16, the speed droop would be increased to the normal value and at all other conditions the governor would operate normally as already described in Figure 1.

Figure 5:
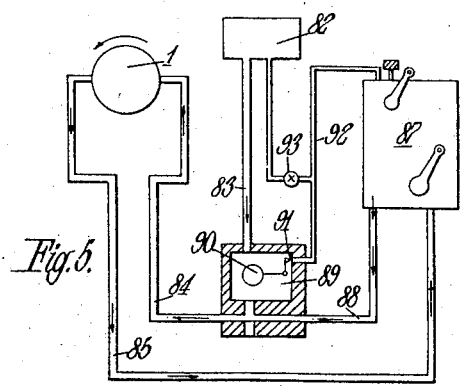
Figure 5 shows a governor circuit including means for the prevention of aeration of the operating medium.

In carrying the invention into effect in a further form illustrated in Figure 5 mechanism may be added to prevent aeration of the operating medium should a shortage occur. Figure 5 shows the governor circuit in which pump 1 draws fluid from header tank 82 through conduits 83 and 84 and delivers it under pressure through conduit 85 to the governor 87 whence it returns through conduit 88 to conduit 84. Should the level in header tank 82 fall for any reason then eventually air will enter chamber 89 and float 90 will fall and open valve 91. Conduit 92 is connected to the terminal point communicating with the stop button cylinder (see Figure 2). When valve 91 opens, therefore, fluid escapes from the stop button cylinder and the prime mover will come to rest. Valve 93 serves to illustrate another method whereby the prime mover may be brought to rest remotely.

Figure 6:
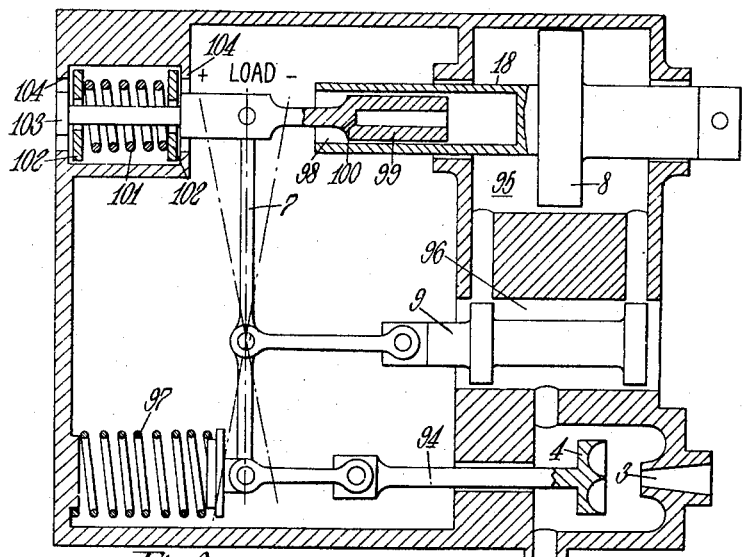
Figure 6 shows a simplified layout of a modified governor according to the present invention.

The invention may be carried into effect in a further form as illustrated in Figure 6 which shows a simplified layout of part of the governor in which in this instance deflector 4 is attached to an axially slidable rod 94, servo piston 8 and servo valve 9 being in parallel bores 95 and 96. Control spring 5 is here represented by a compression spring 97. Servo piston rod 18 is provided with an axial bore 98 in which fits a dashpot piston 99 provided with a short circuiting orifice 100. The dashpot piston 99 is spring loaded to a predetermined position by spring 101 and spring plates 102 which contact shoulders 103 and 104.

Consider the system operating in equilibrium and that the load on the prime mover has just been increased. The prime mover first slows down under the increased load and the force on the deflector 4 diminishes. Control spring 97 moves the deflector towards the nozzle 3 and differential lever 7 causes servo valve 9 to move to the right. This allows pressure fuel in chamber 96 to enter the right hand side of the servo piston and allows discharge from the left hand side to return to the housing. The piston therefore moves to the left and carries with it dashpot piston 99 which in turn recentralises the servo valve and prevents further movement of the piston. The prime mover is therefore now running at a lower speed as a result of the increased load but the dashpot is not in equilibrium since spring 101 has been compressed. Fluid will leak through orifice 100 and the piston 99 will move to the right slightly. This will cause the servo valve to move to the right again which will cause servo piston to move to left and increase the torque of the prime mover slightly with the result that speed will increase and the deflector will move away from the orifice. This process will continue until right hand spring plate 102 contacts shoulder 104 which will prevent any further movement of piston 99. By this time differential lever 7 will have regained its vertical position and the deflector will therefore also have regained its original position. Furthermore since the deflector is again in its original position the thrust acting upon it must be the same as originally and the prime mover therefore must have regained its original speed. The servo piston itself however will have taken up a new position to the left of its original position due to the higher load on the prime mover.

Figure 7 shows a further modification according to the invention in which a further spring 105 is fitted and is also provided with two spring plates 106 which contact shoulders 107 and 108. The purpose of spring 105 is to tend to bias the vertical equilibrium position (see Figure 6) of differential lever 7 to the extent say, of lines 109 and 110 as a function of the displacement of the servo piston between its two extreme positions. The extent of this bias together with the rate of control spring 97 will enable a speed droop characteristic to be achieved without destroying the temporary and greater speed droop characteristic which obtained in Figure 6 and which is desirable for stable operation at low speed droop conditions.

Figure 8:
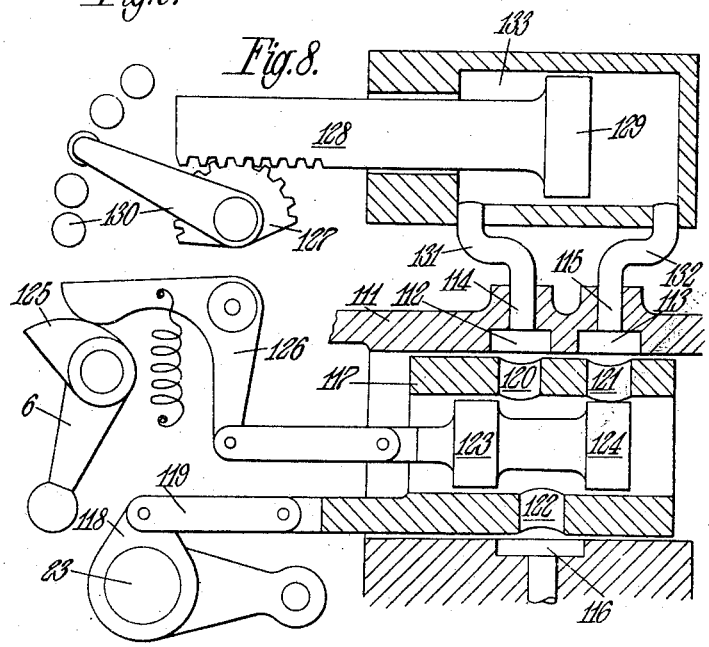
Figure 8 shows a layout of a still further modified governor.

In carrying the invention into effect in a further form illustrated in Figure 8 provision has been made whereby the output torque of a prime mover may be controlled as a function of speed by the torque demanded for example, by a generator or torque converter which the prime mover may be driving.

A bore 111 in the governor housing 2 is formed so as to have two ports 112 and 113 which may if desired communicate to two terminal points 114 and 115 in a convenient outside face of the housing. A third port 116 may be provided intermediate of the first two ports and communicating with a suitable pressurised circuit preferably the servo circuit of the governor itself. A hollow sleeve 117 fits bore 111 in which it is axially slidable, its axial position being governed by rotation of the governor output shaft 23 by means of lever 118 and link 119. Throughout the axial travel of sleeve 117 three further ports 120, 121 and 122 are arranged to communicate individually with ports 112, 113 and 116. A valve having two lands 123 and 124 is axially slidable within sleeve 117 and its axial position is controlled by means of a cam 125 and linkage 126 said cam being carried on or coupled to the speed selector shaft. Conversely, the cam may, if preferred, operate the sleeve or may be carried on the output shaft or a further cam may replace lever 18.

Terminal points 114 and 115 are connected to a hydraulic servo motor represented here by a pinion 127 operated by a rack 128 carrying a piston 129 but the servo motor or hydraulic actuator may take any convenient form. The purpose of the motor is to actuate the torque control of the mechanism being driven by the prime mover and is here represented by a rheostat 130 which may control the excitation of a generator. Ducts 131 and 132 may each or both be provided with valves and/or orifices adapted to control the rate of flow in these ducts in either or both directions.

This mechanism operates in the following manner: Assume the system to be running under equilibrium conditions and that in this case the electrical load has been increased. Increase of load causes the speed to be reduced and in consequence the governor output shaft will turn to the right displacing sleeve 117 also to the right. This permits fluid to escape from the right hand side of servo cylinder 133 permitting piston 129 to move to right under the influence of pressure fluid still bearing on the smaller area of the left hand side of piston 129. This causes the electrical control 130 to reduce the load absorbed by the generator until the speed is regained and sleeve 117 regains its original position where land 124 again covers port 121. The converse motions occur when load is reduced.

If now a speed change is made the servo valve is repositioned by the cam and linkage mechanism 125 and 126 which in turn causes appropriate motions of the sleeve as described above but when equilibrium again obtains the output lever 23 will have taken up a new position according to the requirements of the operating conditions for which the profile of the cam was designed.

I claim:

1. A governor for a prime mover comprising a nozzle, a pump driven from the prime mover delivering fluid to the nozzle to discharge such fluid as a jet having a mass flow that varies as a function of the speed of the prime mover, a single displaceable deflector member disposed in the path of said jet, biasing spring means opposing displacement of the deflector member by the jet so that said member stays in the path of said jet, means for actuating a controlling member of the prime mover and a servo device through which the deflector member is operatively connected to the controlling member, said nozzle and servo device being connected in series and supplied with fluid from the same pump.

2. A governor according to claim 1, including means for modifying the biasing force exerted by the spring means.

3. A governor according to claim 2, wherein said means for modifying the biasing force exerted by the spring means comprise a spindle carrying the deflector member, an abutment member formed on said spindle, said abutment member extending radially through the axis of the spindle, an elastic beam abutting said abutment member and being manually adjustable with respect thereto so as to effect a change in the biasing force exerted on said spindle carying the deflector member.

4. A governor according to claim 1, comprising means for modifying the orifice area of the nozzle as a function of pressure on the upstream side of said orifice for the purpose of controlling the discharge velocity of the jet.

5. A governor according to claim 1, comprising a follow up device in the means for actuating the controlling member of the prime mover, said servo device incorporating means for resetting the original speed of the prime mover after a change in load conditions thereof.

6. A governor according to claim 1, comprising a lost motion device between the deflector member and the biasing spring means, and auxiliary biasing spring means connected in parallel with said lost-motion device.

7. A governor according to claim 1, comprising spring means arranged to oppose action of the governor in a direction to increase the fuel supply to the prime mover, and means for preventing said spring means from acting during starting of the prime mover, said latter means comprising a pawl and automatic mechanism associated with the governor for releasing said pawl after an appropriate interval of time.

8. A governor according to claim 1, comprising a speed selecting lever for the prime-mover and means comprising a spring loaded over-centre mechanism for limiting the torque reaction of said lever to a substantially constant magnitude.

9. A governor according to claim 1, comprising means for by-passing the nozzle and means controlled by a temperature sensitive mechanism for controlling the quantity of fluid by-passed.

10. A governor according to claim 1, comprising manually operable means for varying the area of the nozzle.

11. A governor according to claim 1, comprising means for varying the area of the nozzle and means sensitive to temperature changes for actuating said nozzle area varying means.

12. A governor according to claim 1, comprising servo means controlled by the deflector member for actuating the controlling member of the prime mover, and means for stopping the prime mover, said stopping means being arranged to displace a valve of the servo device so as to cause the power piston of said device to cut off the supply of fuel to the prime mover.

13. A governor according to claim 1, comprising a chamber in the fluid circuit and a float operated valve in said chamber, the said valve being arranged to cause operation of a main stop control to stop the prime mover in the event of the governor circuit becoming aerated due to fuel shortage.

References Cited in the file of this patent

UNITED STATES PATENTS

| | | |
|---|---|---|
| 1,401,887 | Davis | Dec. 27, 1921 |
| 1,411,992 | Doran | Apr. 4, 1922 |
| 1,566,995 | Standerwick | Dec. 22, 1925 |
| 1,814,630 | Myers | July 14, 1931 |
| 1,958,010 | Meurk | May 8, 1934 |
| 2,050,068 | Schaer | Aug. 4, 1936 |
| 2,250,984 | Adler | July 29, 1941 |
| 2,297,897 | Kissel et al. | Oct. 6, 1942 |
| 2,344,308 | Kalin | Mar. 14, 1944 |
| 2,525,602 | Jackson | Oct. 10, 1950 |
| 2,825,353 | Voytech | Mar. 4, 1958 |

FOREIGN PATENTS

| | | |
|---|---|---|
| 305,499 | Great Britain | Jan. 29, 1929 |